(12) United States Patent
Francis et al.

(10) Patent No.: US 7,996,816 B2
(45) Date of Patent: Aug. 9, 2011

(54) METHOD AND APPARATUS FOR DYNAMICALLY BINDING SERVICE COMPONENT IMPLEMENTATIONS FOR SPECIFIC UNIT TEST CASES

(75) Inventors: Timothy Marc Francis, Keswick (CA); Geoffrey Martin Hambrick, Round Rock, TX (US); Stephen Joseph Kinder, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/560,200

(22) Filed: Nov. 15, 2006

(65) Prior Publication Data

US 2008/0115116 A1 May 15, 2008

(51) Int. Cl.
*G06F 9/44* (2006.01)
(52) U.S. Cl. .................. 717/124; 717/134; 717/135
(58) Field of Classification Search .................. 717/134, 717/135
See application file for complete search history.

(56) References Cited

U.S. PATENT DOCUMENTS

| | | | | |
|---|---|---|---|---|
| 5,862,362 A | * | 1/1999 | Somasegar et al. | 703/21 |
| 7,127,641 B1 | * | 10/2006 | Anderson | 714/38 |
| 7,373,636 B2 | * | 5/2008 | Barry et al. | 717/124 |
| 2003/0037314 A1 | * | 2/2003 | Apuzzo et al. | 717/125 |
| 2004/0049372 A1 | * | 3/2004 | Keller | 703/22 |
| 2007/0277154 A1 | * | 11/2007 | Badwe | 717/124 |

* cited by examiner

*Primary Examiner* — Wei Zhen
*Assistant Examiner* — Phillip H Nguyen
(74) *Attorney, Agent, or Firm* — Yee & Associates, P.C.; David A. Mims, Jr.

(57) ABSTRACT

The present invention enables a component under test to bind to a single component, that is capable of simulating most depended upon services, including the details of their interface, whether or not they return explicit results or cause side effects, and regardless of the state of their implementation. This invention includes features that allow for dynamic reconfiguration to meet the needs of both manual and automated testing, including the ability to control normal and exceptional results, as well as features to support both unit and integration testing.

14 Claims, 4 Drawing Sheets

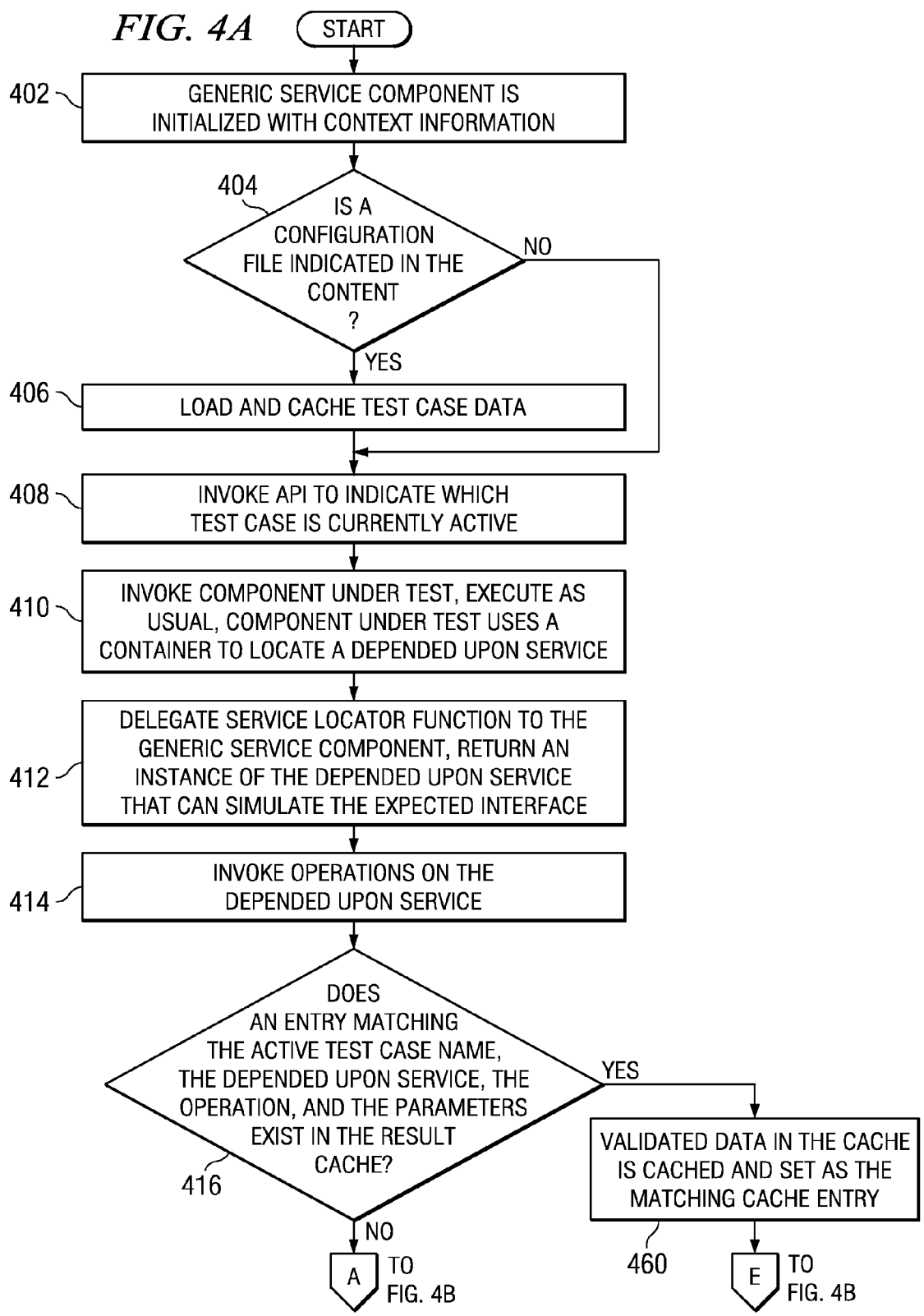

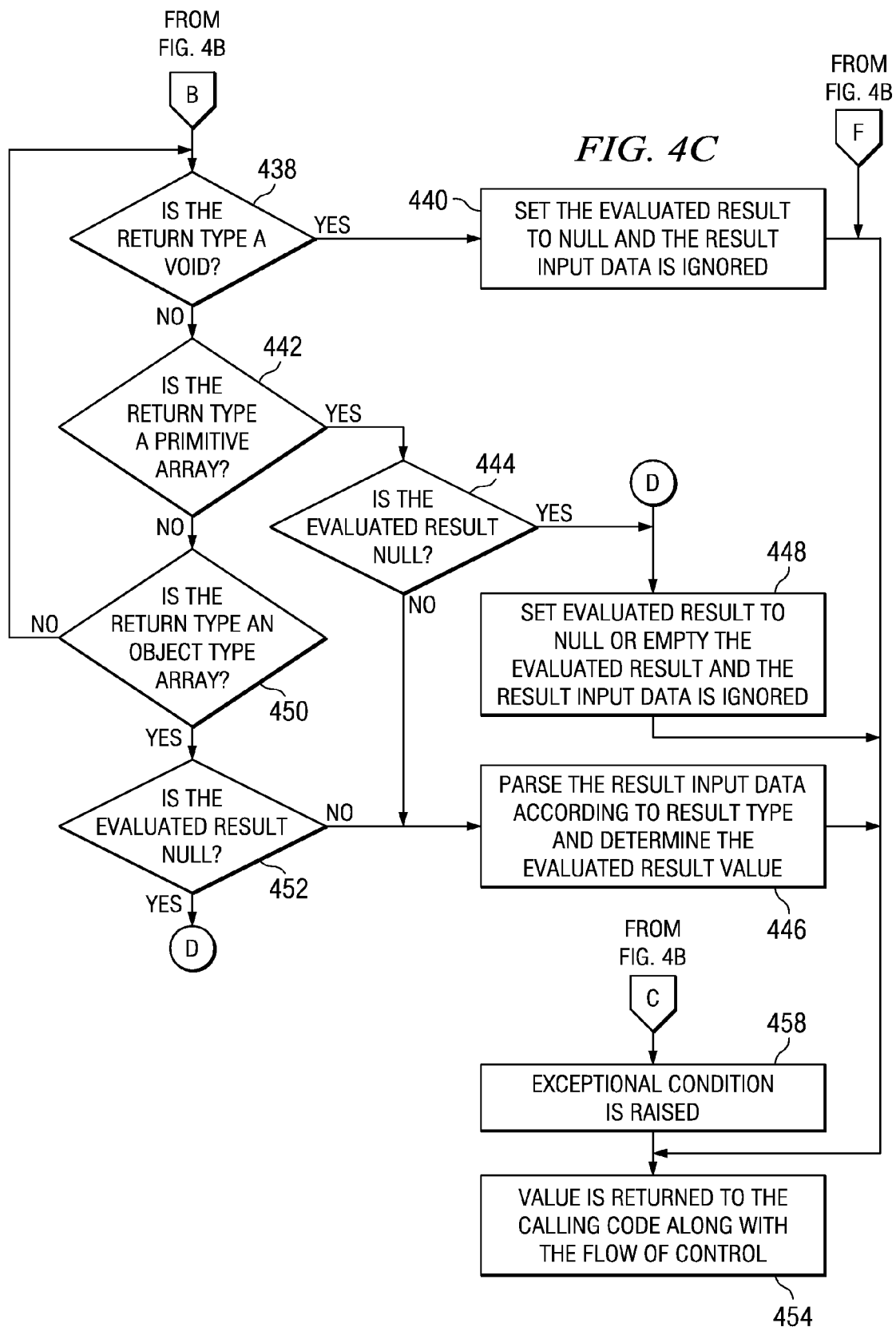

METHOD AND APPARATUS FOR DYNAMICALLY BINDING SERVICE COMPONENT IMPLEMENTATIONS FOR SPECIFIC UNIT TEST CASES

BACKGROUND OF THE INVENTION

1. Field of the Invention

The present invention relates generally to data processing systems. More specifically, the present invention relates to a computer implemented method, computer program product and data processing system for binding service component implementations for specific unit test cases.

2. Description of the Related Art

The most advanced software architectures of today are service oriented, where an enterprise application is composed of one or more independent modules called components, each of which exposes one or more services. Each service is comprised of one or more operations, which, when invoked, perform a specified function. For example, a service may have operations that perform data retrieval, update and validation.

Specifying a service on a component effectively defines an interface in some target language. One language may be used by the user of the service, the client application; while another language may be used by the provider of the service, the implementation. In the course of implementing a service, it is very likely that the service will use other services in its implementation. This establishes a dependency between services that is exactly equivalent to any other client.

An important benefit of a service-oriented architecture is that components can be developed in parallel and reused by many clients including other services in the system. But a significant tradeoff comes during unit testing. Unit testing means verifying that a given service is correct by testing the given service in isolation. Whenever a service is unit tested, the services upon which the component under test depends may not be available. The depended upon services may not be available either because the code for the depended upon service is being developed in parallel to the service being tested, or because loading the depended upon service into the test environment is deemed too expensive.

A component under test with such dependencies on other services is usually bound to an implementation that simulates the depended upon service. A simulated service is often called a "stub" because the service is comprised of operations implemented only enough to allow specific pathways through the code in the component under test to be exercised to insure correctness. However, writing stub code for a depended upon service can be almost as complex as writing the full service implementation.

One reason for this complexity is that the type of output returned by the operations in the depended upon services can vary widely. For example, some operations are "one way" or "output only" functions that do not return a value. As an example, methods that return "void" in Java are one-way services. A void return is a return where nothing was returned. A void is different than a null. A null return is where a data object is returned but the data object is empty. Other operations return a "primitive" type. A primitive data type is a data type that can have only one value at a time and is the simplest built-in form of data, such as an integer, floating point number, or character string. Still others return "data transfer objects." Data transfer objects are complex structures of static data values that can contain both primitives and other data transfer objects. Other operations return objects that may include not just static data values, but also computed values and dynamic connections to system resources that must be initialized through programmatic means at run-time.

Further, some operations return fixed or variable length arrays, meaning zero or more instances, of primitives, structures, or dynamic objects. An array is a collection of one or more data objects, called elements, of the same data type which can be selected by an index belonging to the index subtype of the array.

Another reason for the complexity of implementing a stub is that the number and type of input parameters to a given service operation can vary in a similar manner. Some operations take no parameters, while others take one or more primitive or complex values as input. For example, a service operation performing a read may take a simple integer that represents the unique identifier, known as the "key", of the record. Similarly, an update operation may take a data transfer object that includes both the key and the associated data values.

Yet another reason for the complexity is that many operations differentiate between the normal return of the operation and exceptional conditions that return a different type of result, as described above, for each condition. An exceptional condition is a result other than the normal return. There are two types of exceptions, expected and unexpected. An unexpected (or "system") exception is a problem that prevents the continuation of the method or scope that is executing. For example, a service operation that depends on a database cannot continue execution if the database is down. An expected (or "application") exception is not the normal result of the operation, but is one that can be expected as a possible return. For example, an operation to submit an order may "throw" an application exception if the user does not exist, the order is not in the open state, or if the order has no line items. To throw an exception is to cause the exception to be generated.

Still another reason for the complexity in implementing stub implementations is that some operations, especially those that do not return a value, have a "side effect." A side effect is something which changes the state of the system and that can be discovered by invoking another service or operation. For example, a service operation that inserts a record with a given unique identifier into a database (the side effect) may not return a value as a result. A subsequent call to a service operation that finds the record with the unique identifier will return the record, providing evidence that the insert operation was invoked previously. If the component under test should call these depended upon services in a different order, such as reading before inserting, different values (such as a null return) or exceptional conditions (such as an expected exception, 'the key was not found') may be returned.

Taken together, the complexity of a stub implementation of a depended upon service is that the stub implementation must be able to map the input and current state of the system to the normal or exceptional output such that the stub implementation matches the expectations of the test cases.

The practical result of the benefits of a component architecture and the complexity of stub implementations is that the relationship of a component under test and the depended upon services is always a dynamic one. In the early stages of testing, usually neither the implementation of the depended upon service nor the expectations on a given stub implementation are ready. In this phase, testing is usually manually executed one test case at a time. Sometimes the test cases are executed in an exploratory mode to see which code paths are exercised by given returns from depended upon services.

Later, as the unit test cases get organized into test suites designed to exercise as many paths through the code as necessary to verify correctness, the expectations of the stub implementations become well defined. In this phase, creating a stub implementation such that testing can be automated so that the testing is quickly repeatable, is possible and desirable. And later still, as one or more depended upon services are completed, running the same test suite with the real implementations of one or more depended upon services to verify that the components work together becomes desirable. This latter form of testing is sometimes called integration testing because multiple components are integrated into the same application under test.

To support this kind of dynamic approach to testing, some means are needed to enable a component to be tested without regard to the status of other components, even the stub implementations themselves. The question arises as to how details of calls into a dynamically bound implementation are captured, how the returned values are bound, and how side effects are captured, such that they meet the expectations of the code under test.

SUMMARY OF THE INVENTION

Exemplary embodiments describe a computer implemented method, a computer program product and a data processing system for binding service component implementations for specific unit test cases. A set of data entries is loaded. An interface for a depended upon service is simulated. An operation of the depended service is invoked. A data entry that corresponds to the operation of the depended upon service is determined from the set of data entries. A result is determined from the data entry. The result is output.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A, 4B and 4C are a flowchart illustrating the operation for binding service component implementations for specific unit test cases in accordance with an exemplary embodiment.

DETAILED DESCRIPTION OF THE PREFERRED EMBODIMENT

Figure 1:
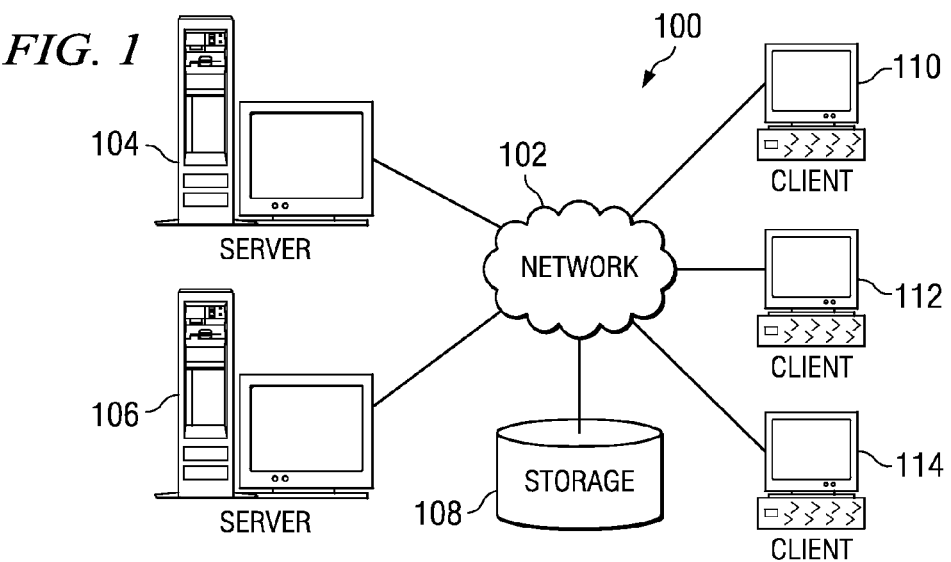
FIG. 1 is a pictorial representation of a network of data processing systems in which exemplary aspects may be implemented.
Figure 2:
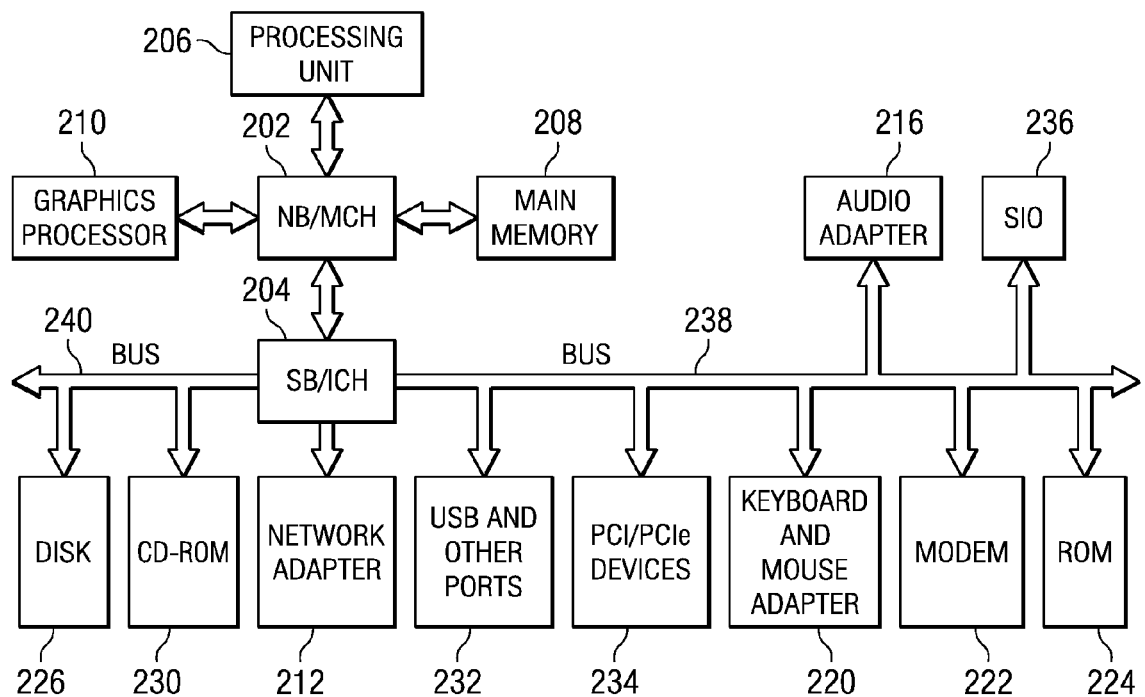
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

An exemplary embodiment provides an implementation of a generic service component that can mimic any arbitrary component depended upon by a component under test using configuration information provided by the user and interpreted at run-time. This generic component implementation can be bound into a component under test to return results for a depended upon component in a number of ways. The simplest way to return results for the depended upon component is to prompt a user to manually type a result encoded as a text string. The generic service component checks the interface of the depended upon service for the operation being invoked to see which result type to parse from "standard input." Standard input is input received from an input device bound to a data processing system, typically a keyboard, which enables manual input. For cases where the operation returns a "void" result, the generic service component could simply wait for the user to press enter to indicate that the operation is completed. However, certain primitive results, like strings, differentiate between an "empty" value, which is a string with no characters, and a "null" value, which is a special reference that indicates no value was supplied. Also, strings often contain embedded new line characters, which are normally indicated by typing the enter key.

An exemplary embodiment includes syntax such as an Extensible Markup Language (XML) tag that enables the generic service component to differentiate between an empty value and a null value. For example, a tag syntax like <result/> could be used to indicate a null (or void) return. A tag syntax like <result></result> could be used to indicate an "empty" value. Wrapping <result></result> around a string of characters allows for unlimited length character strings that include new line characters manually typed using a keyboard.

However, as noted above, many operations return complex data transfer objects. Therefore, the present invention enables complex results to be specified using a structured text form embedded in the result, such as Extensible Markup Language (XML). The generic service component can parse the result for a "schema" describing the syntax of the structured text, such as Extensible Schema Definition (XSD). A schema is an information model implemented in a database that defines the data contents and relationships. Alternatively, a schema may be a description of the structure and rules a document must satisfy for an Extensible Markup Language (XML) document type. This schema enables the generic service component to parse the input formatted according to that schema, and return a result of the specified type with the values initialized. In an exemplary embodiment, an Extensible Markup Language (XML) attribute can be used in the result tag to indicate the schema, for example <result schema=" "> . . . </result>.

In order to facilitate the entry of multiple results to be grouped together as an array, the generic service component supports syntax to differentiate between individual values. One such exemplary embodiment uses an XML tag to group the results that are part of an array result, such as <array><result . . . > . . . </result><result . . . > . . . </result></array>, which is an example that specifies an array with two entries. A syntax such as <array/> can be used as described above to indicate a "null" array, while <array></array> can be used to indicate an empty array.

Previously described exemplary embodiments provide a generic service component that simulates depended upon service operations that return single or multiple instances of voids, primitives, and static data transfer objects that result from a normal return of the operation. However, this syntax does not support object-oriented languages like Java, where an exceptional result can be returned by a service operation under certain conditions. Therefore, an exemplary embodiment provides for a generic service component that can simulate an exceptional return by recognizing a special syntax which indicates that an exception condition should be raised by the operation instead of the operation returning a normal result. In one exemplary embodiment, an XML tag with an attribute such as <result condition="name of the exception condition"> . . . </result> is the special syntax. The contents of the XML tag, which is the information contained between the two tags in the previous example, specifies the data associated with the exception as described above for void, primitive or static data transfer objects.

The above described exemplary embodiments perform properly for most normal and exceptional results returned by testing. However, in the case where dynamic objects with computed values or transient connections to other resources are returned, previously described exemplary embodiments are inadequate. Dynamic objects with computed values or transient connections to other resources need special services to be invoked as part of the initialization. Therefore, exemplary embodiments also provide a generic service component that is able to delegate to a stub function implementation that has the same interface as the depended upon service operation being invoked. This stub function initializes and returns a result that can include dynamic aspects such as computed values and transient connections. One way to achieve this is through a special syntax in the input that indicates the name of the stub function to invoke. For example: <result invoke="service operation"> . . . </result>. When the generic service component parses a result with this syntax from the input, the general service component binds to and invokes the stub function to return the result.

A stub function has access to application programming interfaces (APIs) that the stub function can use to integrate with the operation of the generic service component. For example, the stub function can utilize a cache service provided by the container framework to store data that the stub function may need for subsequent calls when an operation has side effects. A cache service is a method for reading, writing, refreshing, and so forth in cache memory. A container framework is another name for the code that hosts the service components in a service-oriented architecture, whether the component is the component under test or a depended upon component. The stub function has application programming interface (API) access to information about the call not normally passed as part of the operation signature, such as the component under test, the test case name, and the contents of the result tag. The additional information that is not normally passed as part of the operation signature is referred to as context information. The additional context information, along with the depended upon service operation and the input parameter values can be used as elements to uniquely identify a record stored by the cache as partial results from previous executions. The data stored by the stub function can be any arbitrary static or dynamic object that the stub function needs for the current or subsequent operation.

The stub function code can use these application programming interfaces (APIs) and other system services in the usual way to determine the results that should be returned, including raising any exceptions that are part of the depended upon service operation. Exemplary embodiments therefore not only provide a way for the tester to return dynamic objects, but since the referenced stub function can be bound to a depended upon service implementation that is ready to be tested, exemplary embodiments also provide a mechanism for the tester to perform integration testing.

Prompting the tester for a result of any kind, as explained above, is good for enabling a manual form of unit testing. However, prompting for a result is not desirable for use in regression or load testing where a suite of potentially hundreds of test cases are executed in order to cover many paths of execution through the component under test. Regression testing is the selective retesting of a software system that has been modified to ensure that any bugs have been fixed and that no other previously working functions have failed as a result of the fixes and that newly added features have not created new problems with previous versions of the software. Load testing means testing a computer system and its applications or a web application by running the computer system or web application under a full complement (full load) of transactions or users. This kind of testing requires an automated approach. Therefore, one way of returning a result for a depended upon service operation is to enable the generic service component to read primitive results from an input file rather than prompting the user to enter the results manually. The generic service component checks the configuration information required for the implementation to satisfy a depended upon component that is specified by the user and loaded when the generic service component is bound into the component under test to see if the generic service component should take the prompted values from a file rather than from standard input.

The result data contained in the input file is syntactically equivalent to a result that is manually entered by the tester as described above. Thus, the input file can enable simulating normal or exceptional results from service operations that return voids, primitives, static data transfer objects, or dynamic objects needing run-time initialization. An exemplary embodiment provides for configuration data that uses a structured text form such as Extensible Markup Language (XML) with tags to specify the test case and results. However, it should be noted that exemplary embodiments may be implemented utilizing any equivalent form and that the description provided in the present example is not meant to limit exemplary embodiments in any way.

Below is an example of a test case configured to use manual input, followed by a test case where the input comes from an external file, followed by a third test case where the input is embedded directly in the generic service component configuration file:

```
<test case="test 1" input="manual"/>
<test case="test 2" input="c:/test/test2.xml"/>
<test case="test 3">
    <result/>
    <result>1</result>
    <result>Hello world</result>
    <result condition="NameNotFound"/>
</test>
```

Reading results from an input file, regardless of the syntax, helps support automated regression and load testing, but only when the tester knows the exact order in which calls to depended upon services will be made by the component under test for a given test case. Even if the order of the calls is known at one point in the lifecycle of a component under test, code changes caused by performance or other reasons may cause depended upon services to be called in a different order, or even to be skipped altogether. Therefore, one exemplary embodiment comprises information to identify the depended upon service, operation, and input parameters for a given test case. This identifying information is used by the generic service component at run-time to perform the depended upon service operation regardless of when the call is made by the component under test. The configuration data can use structured text syntax, such as XML, for a test with extra attributes to identify the depended upon component, the operation name, and the input parameters. For example:

```
<test case="..." service="" operation="">
    <input parameter="...">...</input>...
    <result...>...</result>
</test>
```

The syntax used to specify input parameter values can be the same as that used to specify results, since the points of variability with respect to type and cardinality are the same. Cardinality refers to the number of elements, or members, of a set. The syntax shown above is organized in a "flat" fashion. A flat fashion organization means an organization with multiple identifying attributes specified in a single tag. However, other exemplary embodiments provide for organizing the configuration data by test case, depended upon service, or even operation as separate tags nested in any order to reduce redundancy in the specification file when many simulations share the same identifying characteristics.

A generic service component configured in this manner is able to simulate normal and exceptional results for operations that have no side effects. The results are always the same for a given set of input parameters, regardless of how many times the operation is called, and no matter what the order. However, many depended upon services, like those that access data, have operations that cause side effects that are visible to the application through execution of other operations. To support simulating operations with side effects, exemplary embodiments enable specifying the results of related operations that should be returned after the currently simulated service operation is invoked. An exemplary embodiment uses a structured Extensible Markup Language (XML) syntax to allow a tester to specify zero or more side effects to be associated with a given depended upon service test case. For example:

```
<test case="..." service="" operation="">
    <input parameter="...">...</input>...
    <result...>...</result>
    <effect service="" operation="">
        <input parameter="...">...</input>...
        <result...>...</result>
    </effect>...
</test>
```

Exemplary embodiments enable both normal and exceptional results to be returned for depended upon services and simulation of relatively complex side effects rather simply. For example, a test case may be configured to simulate two service operations: one operation to read an order, and another operation to create an order. The simulation for the read operation could be initially configured to raise an order not found exception, with the expectation that a create order operation should come first. The initial configuration for the simulation of the create order operation would return a successful result, a void, and cause two side effects. The first side effect would cause subsequent create order operations with the same input parameters specifying the identity of the order to raise an exception that the order already exists. The second side effect would cause subsequent read order operations with the identity of the order to return the valid order instead of raising the not found exception. Below is an example of the configuration data following the exemplary embodiment to specify this interaction between two service operations described previously:

```
<test case="1" service="order" operation="read">
    <input parameter="id">1</input>
    <result condition="OrderNotFound"/>
</test>
<test case="1" service="order" operation="create">
    <input parameter="id">1</input>
    <input parameter="name">Test</input>
    <result/>
    <effect service="order" operation="create">
        <input parameter="id">1</input>
        <result condition="OrderAlreadyExists/>
    </effect>
    <effect service="order" operation="read">
        <input parameter="id">1</input>
        <result schema="Order">
            <id>1</id>
            <name>Test</name>
        </result>
    </effect>
</test>
```

Figure 3:
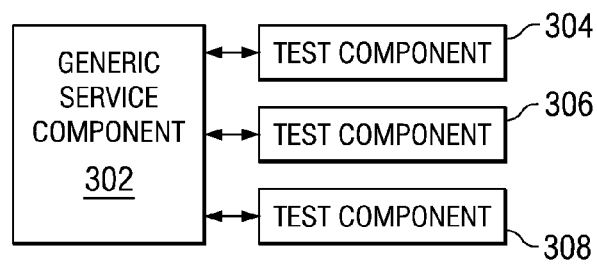
FIG. 3 is a block diagram depicting components for binding service component implementations for specific unit test cases in accordance with an exemplary embodiment.

The generic service component would use the described configuration data model as a means to drive the execution of a test case without necessarily getting input from a user, as explained in FIG. 3.

Turning back to the figures, FIG. 3 is a block diagram depicting components for binding service component implementations for specific unit test cases in accordance with an exemplary embodiment. Generic service component 302 is a component that can be bound into a component under test, such as test components 304, 306 and 308, to return results for a depended upon service operation in a number of ways. When any test component of test components 304, 306 and 308 is being tested, generic service component 302 is bound to that component and is capable of simulating any depended upon service operation.

Figure 4B:
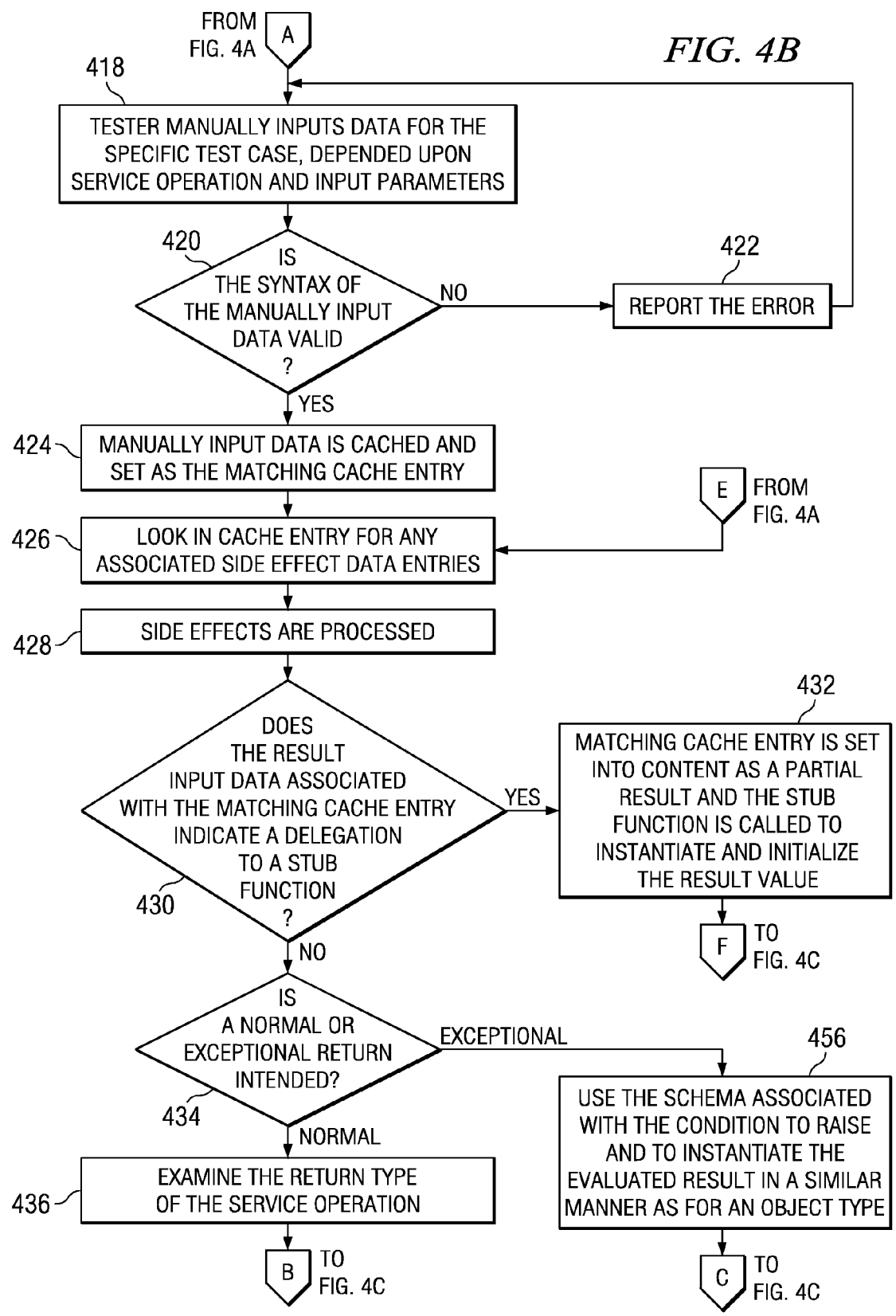

FIGS. 4A, 4B and 4C are a flowchart illustrating the operation for binding service component implementations for specific unit test cases in accordance with an exemplary embodiment. The operation of FIGS. 4A, 4B and 4C may be implemented in a generic service component, such as generic service component 302 in FIG. 3. The operation begins when the container for the component under test is activated. At this point, the generic service component is initialized with context information that includes an optional reference to a file containing the configuration data model (step 402). Next, the operation determines if a configuration file is indicated in the content (step 404). If the operation determines that a configuration file is indicated (a 'yes' output to step 404), the generic service component loads and caches the test case data contained within the configuration file (step 406).

Caching means storing the data in cache memory. The entry in the cache, also referred to as a cache entry, is identified by the test case name, the depended upon service, the operation, and the input parameters. The data that is cached includes the results and side effects for the depended upon service. If no configuration file is indicated (a 'no' output to step 404), the operation skips the load and caching in step 406 and proceeds to step 408.

Just prior to invoking any service operations of the components under test, the test case code invokes an application programming interface (API) to indicate which test case is currently active (step 408). Step 408 is an optional step and exemplary embodiments may be implemented without including step 408. The test case code invokes the component under test which executes as usual, where the component under test eventually uses the container to locate a depended upon service (step 410). The container delegates the service locator function to the generic service component, which returns an instance of the depended upon service that can simulate the expected interface (step 412). The service locator function locates the desired function. The component under test then invokes operations of the depended upon service that are actually delegated to the generic service component (step 414).

The generic service component determines if an entry matching the active test case name, the depended upon service, the operation, and the parameters exist in the result cache (step 416). If the generic service component determines that a matching entry does not exist in the result cache (a 'no' output to step 416), then the generic service component prompts the tester to manually input the data for the specific test case, depended upon service operation, and input parameters (step 418). This condition can occur when no configuration data is found to exist in the load and caching operation in step 406. After the data is manually entered by the tester, the data is parsed and the operation determines if the syntax of the manually input data is valid (step 420). If the operation determines that the syntax of the manually input data is not valid (a 'no' output to step 420), the generic service component reports the error (step 422) and prompts the user to manually input the data again, returning to step 418. If the operation determines that the syntax of the manually input data is valid (a 'yes' output to step 420), the manually input data is cached and set as the matching cache entry (step 424).

Returning now to step 416, if a matching entry exists in the result cache (a 'yes' output to step 416), then the validated data in the cache is itself cached and set as the matching cache entry instead of the data manually input by the tester (step 460). In this manner, the data is associated with the cache whether its origin was the configuration data or manually input by the tester.

The generic service component looks in the cache entry for any associated side effect data entries (step 426). Each of these side effects, if any, include the identifying test case name, depended upon service operation and input parameters used to set, or reset, an entry into the cache to simulate results of subsequent calls. The side effects are processed (step 428). After all the side effects are processed, the result input data associated with the matching cache entry is examined to determine if a delegation to a stub function is indicated (step 430). An example of possible syntax used to indicate the need to delegate to a stub function is <result invoke="stub function">...</result>. If the operation determines that the result input data does indicate a delegation to a stub function (a 'yes' output to step 430), the operation sets the matching cache entry into the content as a partial result and the stub function is called to instantiate and initialize the result value, whether it be a normal or exceptional result (step 432). Then the value is returned to the calling code along with the flow of control (step 454).

If the operation determines that the result input data does not indicate a delegation to a stub function (a 'no' output to step 430), then the operation examines the result input data to determine whether a normal or an exceptional return is intended (step 434). If the operation determines that a normal return is intended (a normal output to step 434), then the operation examines the return type of the service operation (step 436).

In exemplary embodiments, the operation of steps 438, 442, and 450 may be performed in any order. The order of operation of steps 438, 442, and 450, as presented in the present example, serve only to illustrate one possible implementation of an exemplary embodiment and are not intended to in any way limit exemplary embodiments to the form illustrated in the present example.

Next, the operation determines whether the return type of the service operation is a void (step 438). If the operation determines that the return type of the service operation is a void (a 'yes' output to step 438), then the operation sets the evaluated result to null and the result input data is ignored (step 440). If the operation determines that the return type of the service operation is not a void (a 'no' output to step 438), then the operation determines whether the return type is a primitive array (step 442). If the operation determines that the return type is a primitive array (a 'yes' output to step 442), the operation determines whether the result input data indicates that the evaluated result is to be null (step 444). If the evaluated result is not a null then the evaluated result will include zero or more entries. If the operation determines that the result input data does not indicate that the evaluated result is to be null (a 'no' output to step 444), the operation parses the result input data according to the result type, such as integer or floating point, to determine the evaluated result value (step 446).

If the operation determines that the result input data indicates that the evaluated result is to be null (a 'yes' output to step 444), then the operation sets the evaluated result to null or empties the evaluated result and the result input data is ignored (step 448). The result input data can indicate that the evaluated result is to be either null using syntax such as <array/> or contain zero or more entries using syntax such as <array></array>, which wraps zero or more result entries evaluated, for example.

Returning now to step 442, if the operation determines that the return type of the service operation is not a primitive array (a 'no' output to step 442), then the operation determines whether the return type is an object type array (step 450). If the operation determines that the return type is not an object type array (a 'no' output to step 450), then the operation returns to step 438 to continue to determine the return type.

If the operation determines that the return type is an object type array (a 'yes' output to step 450), then the operation determines whether the result input data indicates that the evaluated result is to be null (step 452). If the operation determines that the result input data indicates that the evaluated result is to be null (a 'yes' output to step 452), then the operation sets the evaluated result to null or empties the evaluated result and the result input data is ignored (step 448). The result input data can indicate that the evaluated result is to be either null using syntax such as <array/> or contain zero or more entries using syntax such as <array></array>, which wraps zero or more result entries evaluated, for example.

If the operation determines that the result input data indicates that the evaluated result is not to be null (a 'no' output to step 452), then the operation parses the result input data according to the result type, such as integer or floating point, to determine the evaluated result value (step 446).

Once the result is evaluated by one of the above methods, including delegation to a stub function, the value is returned to the calling code along with the flow of control (step 454).

Returning now to step 434, if the operation determines that an exceptional return is intended (an exceptional output to step 434), then the operation uses the schema associated with the condition to raise and to instantiate the evaluated result in a similar manner as for an object type (step 456), and an exceptional condition is raised (step 458), passing the result and flow of control back to the calling code in the component under test (step 454).

Flow of control between the code in the component under test and the depended upon service operations simulated by the generic service component continues as described until the test case(s) complete.

In another exemplary embodiment, the configuration data has results listed in sequential order, possibly ordered by test case. Instead of looking for a matching cache entry, as indicated in step 416, the next sequential result with a return type matching the return type for the depended upon service operation being invoked is selected as the matching entry, skipping those entries that do not match. If no more records exist, then manual input is used to initialize the matching entry, as stated in step 418. This exemplary embodiment may be implemented in combination with the previously described exemplary embodiment, where the sequential data is used if a matching cache entry is not found.

In another exemplary embodiment, the number of simulated service operations is counted and time statistics are gathered. These pieces of information are then able to be formatted and output to a file for reporting purposes.

In another exemplary embodiment, an additional attribute is added to the result tag that indicates how long the function should take, inducing a delay loop to be executed prior to the result being returned, be it a normal or exceptional result.

And in yet another exemplary embodiment, manually input data can be cached as it is entered, and the cache written out to a file. This file can then be used to configure the generic service component in subsequent automated runs of the test cases.

It should be noted that while the exemplary embodiments detailed above have been described in terms of tags and attributes, those of ordinary skill in the art will recognize any equivalent method of denotation may be used and the use of the terms attribute and tag with the description of the exemplary embodiments is in no way meant to limit the scope of the exemplary embodiments.

In another exemplary embodiment, the configuration data for static results, which are those results without delegation, is pre-evaluated and cached at load time to speed processing during execution.

Furthermore, in another embodiment, the canonical form of the configuration data can be used with tools, such as the "Design Pattern Toolkit", to generate one or more service implementations as components in the same language of the component under test. These generated components can be bound into the unit test environment and will execute more efficiently than the generic service component, which has to parse and interpret the inputs and results associated with the configuration data at run-time. The resulting system of pre-compiled stub implementations would be efficient enough to unit test even the most demanding systems. As an example, an XML document can be translated into Java™ classes which can be pre-compiled so that the system may run faster.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of binding depended upon service implementations for specific unit test cases for a component, the computer implemented method comprising:
   loading a set of data entries that correspond to results of an operation of the depended upon service;
   simulating an interface for the depended upon service, wherein the component depends upon the depended upon service, and wherein simulating the interface for the depended upon service is performed by a generic service component, and wherein the generic service component delegates to a stub function to return a result that includes dynamic aspects;
   invoking the operation of the depended upon service;
   determining a data entry from the set of data entries that corresponds to the result of the operation of the depended upon service;
   assigning the data entry as the result; and
   outputting the result.

2. The computer implemented method of claim 1, further comprising:
   in response to a determination that a data entry from the set of data entries that corresponds to the operation of the depended upon service does not exist, prompting a user to manually enter data that corresponds to the operation.

3. The computer implemented method of claim 1, further comprising:

determining a data entry from the set of data entries that changes a state of the unit test case by modifying a result expected to be returned by subsequent calls to one or more depended upon services, including the depended upon service; and processing the data entry.

4. The computer implemented method of claim 1, further comprising:

examining the result to determine whether a normal return or an exceptional return is expected.

5. The computer implemented method of claim 4, further comprising:

in response to a determination that the normal return is expected, determining a type of return.

6. The computer implemented method of claim 1, wherein determining the result from the data entry further comprises:

matching context information and parameters of a call to an entry in cache to determine the result.

7. The computer implemented method of claim 1, wherein determining the result from the data entry further comprises:

selecting the result from input data, wherein the input data is selected in a sequential manner.

8. The computer implemented method of claim 1, further comprising:

outputting a cache to serve as a configuration file.

9. The computer implemented method of claim 1, further comprising:

compiling a configuration file.

10. A computer program product comprising a non-transitory computer usable medium including computer usable program code for specific unit test cases for a component, the computer program product comprising:

computer usable program code for loading a set of data entries that correspond to results of an operation of a depended upon service;

computer usable program code for simulating an interface for the depended upon service, wherein the component depends upon the depended upon service, and wherein simulating the interface for the depended upon service is performed by a generic service component, and wherein the generic service component delegates to a stub function to return a result that includes dynamic aspects;

computer usable program code for invoking the operation of the depended upon service;

computer usable program code for determining a data entry from the set of data entries that corresponds to the result of the operation of the depended upon service;

computer usable program code for assigning the data entry as the result; and computer usable program code for outputting the result.

11. The computer program product of claim 10, further comprising:

computer usable program code, in response to a determination that a data entry from the set of data entries that corresponds to the operation of the depended upon service does not exist, for prompting a user to manually enter data that corresponds to the operation.

12. The computer program product of claim 10, further comprising:

computer usable program code for determining a data entry from the set of data entries that changes a state of the unit test case by modifying a result expected to be returned by subsequent calls to one or more depended upon services, including the depended upon service; and computer usable program code for processing the data entry.

13. The computer program product of claim 10, further comprising:

computer usable program code for examining the result to determine whether a normal return or an exceptional return is expected.

14. A data processing system for binding depended upon service implementations for specific unit test cases for a component, the data processing system comprising:

a storage device, wherein the storage device stores computer usable program code; a bus coupled to the storage device; and a processor coupled to the bus, wherein the processor executes the computer usable program code to:

load a set of data entries that correspond to results of an operation of the depended upon service;

simulate an interface for the depended upon service, wherein the component depends upon the depended upon service, and wherein simulating the interface for the depended upon service is performed by a generic service component, and wherein the generic service component delegates to a stub function to return a result that includes dynamic aspects;

invoke the operation of the depended upon service;

determine a data entry from the set of data entries that corresponds to the result of the operation of the depended upon service;

assign the data entry as the result; and output the result.

\* \* \* \* \*